(12) United States Patent
Worley, III et al.

(10) Patent No.: US 10,045,400 B2
(45) Date of Patent: *Aug. 7, 2018

(54) AUTOMATED MOBILE VEHICLE POWER MANAGEMENT AND RELIEF PLANNING

(71) Applicant: Amazon Technologies, Inc., Seattle, WA (US)

(72) Inventors: William Spencer Worley, III, Camano Island, WA (US); Eric Mathew Clayton, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,377

(22) Filed: Jul. 28, 2017

(65) Prior Publication Data

US 2017/0347393 A1     Nov. 30, 2017

Related U.S. Application Data

(63) Continuation of application No. 15/043,367, filed on Feb. 12, 2016, now Pat. No. 9,723,656, which is a
(Continued)

(51) Int. Cl.
*H04W 88/08*     (2009.01)
*H04W 4/021*     (2018.01)
(Continued)

(52) U.S. Cl.
CPC ............ *H04W 88/08* (2013.01); *A63H 17/26* (2013.01); *A63H 27/12* (2013.01); *A63J 1/00* (2013.01);
(Continued)

(58) Field of Classification Search
CPC .... H04W 88/08; H04W 4/021; H04B 1/3822; B64C 39/024; B64C 2201/122;
(Continued)

(56) References Cited

U.S. PATENT DOCUMENTS 5,530,330 A   6/1996   Baiden et al.
5,659,476 A *   8/1997   LeFebvre ........... G01C 21/3415
                                                       701/417

(Continued)

FOREIGN PATENT DOCUMENTS

CN        103274226 A    9/2013
JP         2000042959 A    2/2000
(Continued)

OTHER PUBLICATIONS

Notani et al., GaAs Multi-chip Power Amplifier Module using a Multi-layer 'TAB Tape, 1994, IEEE, p. p. 145-148.*
(Continued)

*Primary Examiner* — Mcdieunel Marc
(74) *Attorney, Agent, or Firm* — Athorus, PLLC

(57) ABSTRACT

An automated mobile vehicle configured to autonomously provide coverage for inoperable infrastructure components at various locations. In accordance with implementations, a plurality of automated mobile vehicles are deployed to provide emergency lighting, a wireless network, audio, video, etc., at an indoor and/or outdoor event area.

20 Claims, 9 Drawing Sheets

Related U.S. Application Data continuation of application No. 14/460,269, filed on Aug. 14, 2014, now Pat. No. 9,260,028, which is a continuation of application No. 14/109,285, filed on Dec. 17, 2013, now Pat. No. 8,825,226.

(51) Int. Cl.

| | | |
|---|---|---|
| *H04B 1/3822* | (2015.01) | |
| *B64C 39/02* | (2006.01) | |
| *B60L 11/18* | (2006.01) | |
| *A63J 1/00* | (2006.01) | |
| *A63H 17/26* | (2006.01) | |
| *A63H 27/00* | (2006.01) | |
| *G05D 1/10* | (2006.01) | |
| *G05D 1/02* | (2006.01) | |

(52) U.S. Cl.
CPC ......... *B60L 11/182* (2013.01); *B60L 11/1816* (2013.01); *B60L 11/1824* (2013.01); *B64C 39/024* (2013.01); *G05D 1/0297* (2013.01); *G05D 1/104* (2013.01); *H04B 1/3822* (2013.01); *H04W 4/021* (2013.01); *B64C 2201/122* (2013.01)

(58) Field of Classification Search
CPC ........................ B60L 11/1824; B60L 11/1816; B60L 11/182; A63J 1/00; A63H 17/26; A63H 27/12; G05D 1/104; G05D 1/0297
See application file for complete search history.

(56) References Cited

U.S. PATENT DOCUMENTS

| | | | |
|---|---|---|---|
| 6,163,745 | A | 12/2000 | Purchase et al. |
| 6,470,989 | B1 | 10/2002 | Puputti et al. |
| 6,822,551 | B2 | 11/2004 | Li et al. |
| 7,254,464 | B1 | 8/2007 | McLurkin et al. |
| 7,392,151 | B2 | 6/2008 | Mäkelä |
| 7,725,232 | B2 | 5/2010 | Mäkeläet al. |
| 7,899,599 | B2 | 3/2011 | Mäkeläet al. |
| 8,027,750 | B2 | 9/2011 | Orita et al. |
| 8,232,745 | B2 | 7/2012 | Chemel et al. |
| 8,565,913 | B2 | 10/2013 | Emanuel et al. |
| 8,688,598 | B1 | 4/2014 | Shakes et al. |
| 8,825,226 | B1 * | 9/2014 | Worley, III ............... A63J 1/00 180/170 |
| 9,064,288 | B2 | 6/2015 | Abhyanker |
| 9,260,028 | B2 * | 2/2016 | Worley, III ............... A63J 1/00 |
| 9,441,981 | B2 | 9/2016 | Abhyanker |
| 9,451,020 | B2 | 9/2016 | Liu et al. |
| 9,459,622 | B2 | 10/2016 | Abhyanker |
| 9,473,747 | B2 | 10/2016 | Kobres et al. |
| 9,723,656 | B2 * | 8/2017 | Worley, III ............... A63J 1/00 |
| 2002/0095239 | A1 | 7/2002 | Wallach et al. |
| 2007/0179669 | A1 | 8/2007 | McLurkin et al. |
| 2008/0109114 | A1 | 5/2008 | Orita et al. |
| 2009/0265193 | A1 | 10/2009 | Collins et al. |
| 2010/0076631 | A1 | 3/2010 | Mian |
| 2011/0130636 | A1 | 6/2011 | Daniel et al. |
| 2012/0191272 | A1 | 7/2012 | Andersen et al. |
| 2013/0011234 | A1 | 1/2013 | Pretlove et al. |
| 2014/0365258 | A1 | 12/2014 | Vestal et al. |

FOREIGN PATENT DOCUMENTS

| | | |
|---|---|---|
| JP | 2003152612 A | 5/2003 |
| JP | 2004032062 A | 1/2004 |
| JP | 2005086262 A | 3/2005 |
| JP | 2006106919 A | 4/2006 |
| JP | 2006279310 A | 10/2006 |
| JP | 2006295425 A | 10/2006 |
| JP | 2007245317 A | 9/2007 |
| WO | 2012173632 A1 | 12/2012 |

OTHER PUBLICATIONS

Papakokkinos et al., Designing of an Emergency Energy Module for Relief and Refugee Camp Situations: Case Study for a Refugee Camp in Chad-Sudan Border, 2011, IEEE, p. 9-14.*

Li et al., An Improved Architecture and Implement of Rescue Robot, 2010, IEEE, p. 237-329.*

Aerosight, "We Can Make Almost Anything Fly! DomiCopter Case Study", "http://www.aerosight.co.uk/bespoke-projects/", 2013, Publisher: Aerosight UAV Ltd.

Angus Mackenzie, "Domino's DomiCopter Takes Pizza Delivery Airborne", "http://www.gizmag.com/dominos-domicopter-pizza-delivery/27814/", Jun. 6, 2013.

Connor Adams Sheets, "China Beat Amazon Prime Air to the Commercial Drone Delivery Market", "http://www.ibtimes.com/china-beat-amazon-prime-air-commercial-drone-delivery-market", Dec. 2, 2013.

Dezeen, "World's First Drone Delivery Service Launches in Australia", "http:i/vimeo.com/76965171", 2014, Publisher: Vimeo, LLC.

Gwynn Guilford Quartz, "Australia and China are Beating Amazon in the Commercial Drone Race", "http://www.nextgov.com/emerging-tech/2013/12/australia-and-china-are-beating-amazon", Dec. 2, 2013, Publisher: Nextgov.

International Search Report for PCT Application No. PCT/US2014/070687 dated Mar. 18, 2015.

Shanghalist China, "InCake UFO Delivery Service", "http://e.weibo.com/incake", Jul. 23, 2013.

Tacopter, Inc."Flying Robots Deliver Tacos to Your Location, Easy Ordering on Your Smartphone", Jan. 29, 2014, "http:// tacocopter.com/".

Extended European Search Report for EP Application No. 14872228.3 dated Jul. 24, 2017.

Serge Chaumette et al: "Secure cooperative ad hoc applications within UAV fleets position paper", Military Communication Conference, 2009, MICOM 2009, IEEE, Piscataway, NJ, USA, Oct. 18, 2009, pp. 1-7.

* cited by examiner

AUTOMATED MOBILE VEHICLE POWER MANAGEMENT AND RELIEF PLANNING

PRIORITY CLAIM

This application is a continuation of U.S. Pat. No. 9,723,656, filed Feb. 12, 2016, entitled "Automated Aerial Vehicle Wireless Communication and Networks," which is a continuation of U.S. Pat. No. 9,260,028, filed Aug. 14, 2014, entitled "Relay Locations For Mobile Automated Vehicles," which is a continuation of U.S. Pat. No. 8,825,226, filed Dec. 17, 2013, entitled "Deployment of Mobile Automated Vehicles," all of which are incorporated herein by reference in their entirety.

BACKGROUND

Locations, such as houses, stadiums, buildings, etc., are often configured with multiple infrastructure components, such as lighting, audio, video, networking, etc. Individuals and/or devices positioned within these locations often rely on the operation of the infrastructure components. When there is an interruption in an infrastructure component, the services or functions being performed by the humans and/or devices may also be interrupted. For example, individuals located in an office building rely on lighting and networking for their business to operate. If the lighting goes out, many of the functions performed by the individuals cannot be completed in the dark.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
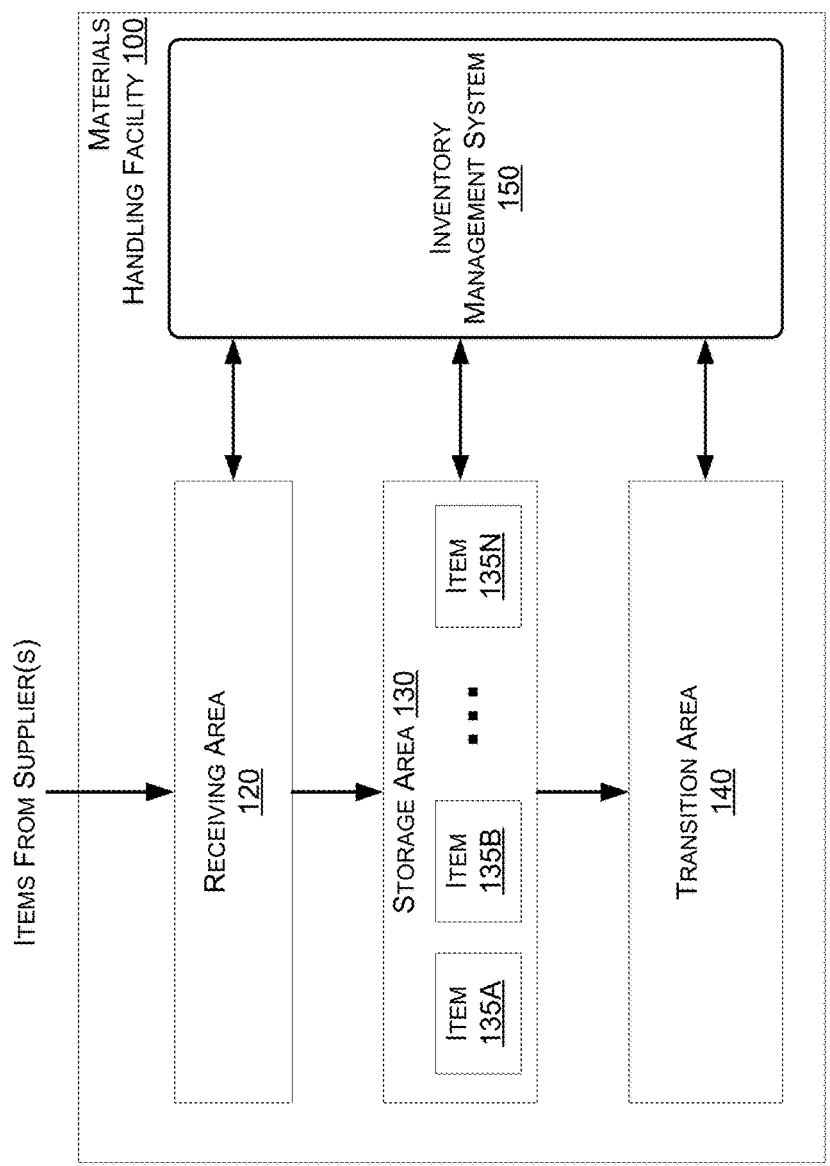
FIG. 1 depicts a block diagram of a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an automated mobile vehicle ("AMV") system and process for autonomously deploying automated mobile vehicles to provide infrastructure components when other existing infrastructure components become inoperable. For example, if a wireless network access point within a materials handling facility becomes inoperable, the event (inoperability of an infrastructure component) is detected and an AMV configured with a wireless network access point is deployed to a position within the materials handling facility so that it can replace the inoperable wireless network access point. In some implementations, the position of the deployed AMV may be the location of the inoperable wireless network access point. In other implementations, the position of the deployed AMV may be at a relief location (discussed below) near the inoperable wireless network access point, wherein the AMV can receive power, network connectivity and the like.

While the above example discusses the use of an AMV to replace an inoperable wireless network access point, any number and/or combination of AMVs may be deployed to provide a variety of services, functions and/or functionality (collectively referred to herein as "coverage"). For example, AMVs may be deployed to provide temporary lighting, audio input, audio output, video input, video output, a wireless network, a wireless network access point, etc.

Likewise, while the above example discusses using one AMV to replace an inoperable infrastructure component, in other implementations, multiple AMVs may be deployed with the same and/or different components to cover an area, referred to herein as an event area. The multiple AMVs may all provide the same coverage and/or one or more of the AMVs may provide different types of coverage. For example, some AMVs may provide emergency lighting while other AMVs may provide audible output (e.g., audible directions to an exit).

The implementations discussed herein may be utilized in both indoor environments, such as within buildings, stores, homes, stadiums, materials handling facilities, and/or outdoor environments, such as parks, streets, amphitheaters, etc. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

A "recovery location," as used herein, is any stationary or movable location configured in such a manner that an AMV can dock, land or otherwise position itself on the recovery location and charge (e.g., power modules), receive network connectivity, replace batteries, receive updates (e.g., software or firmware updates), and/or receive service. For example, a recovery location may be a transportation unit (e.g., car, truck, van, train, ship), top of a cellular tower, building rooftop, ledge within a building, hook to which the AMV can attach, etc. As discussed below, the charging, network connectivity, updates, etc., may be provided via direct physical connection (e.g., wired connection) or through a wireless connection, such as conductive charging.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130, transition area 140 and/or users within the materials handling facility 100.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities, such as units of length, area, volume, weight, time duration (e.g., expiration dates) or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. For example, in one implementation, a user may have a list of items to pick and may progress through the materials handling facility picking items 135 from the storage area 130. In other implementations, materials handling facility employees may pick items 135 using written or electronic pick lists derived from customer orders.

Receiving 120, storing 130, picking, packing, and transitioning items may be done by humans and/or devices. In many instances, these humans and/or devices rely on the infrastructure of the materials handling facility to perform their tasks (e.g., receiving, storing, picking, packing). If an infrastructure component becomes inoperable, the humans and/or devices may not be able to perform their tasks and may likewise become inoperable or less efficient. As discussed below, the implementations described herein reduce this problem by deploying one or more AMVs to locations within the materials handling facility that can provide or replace the inoperable infrastructure component. For example, an AMV may be configured to provide lighting, wireless network, audio, and/or video such that it can be deployed to a position within the materials handling facility upon the detection of an event (an infrastructure component becoming inoperable).

Figure 2:
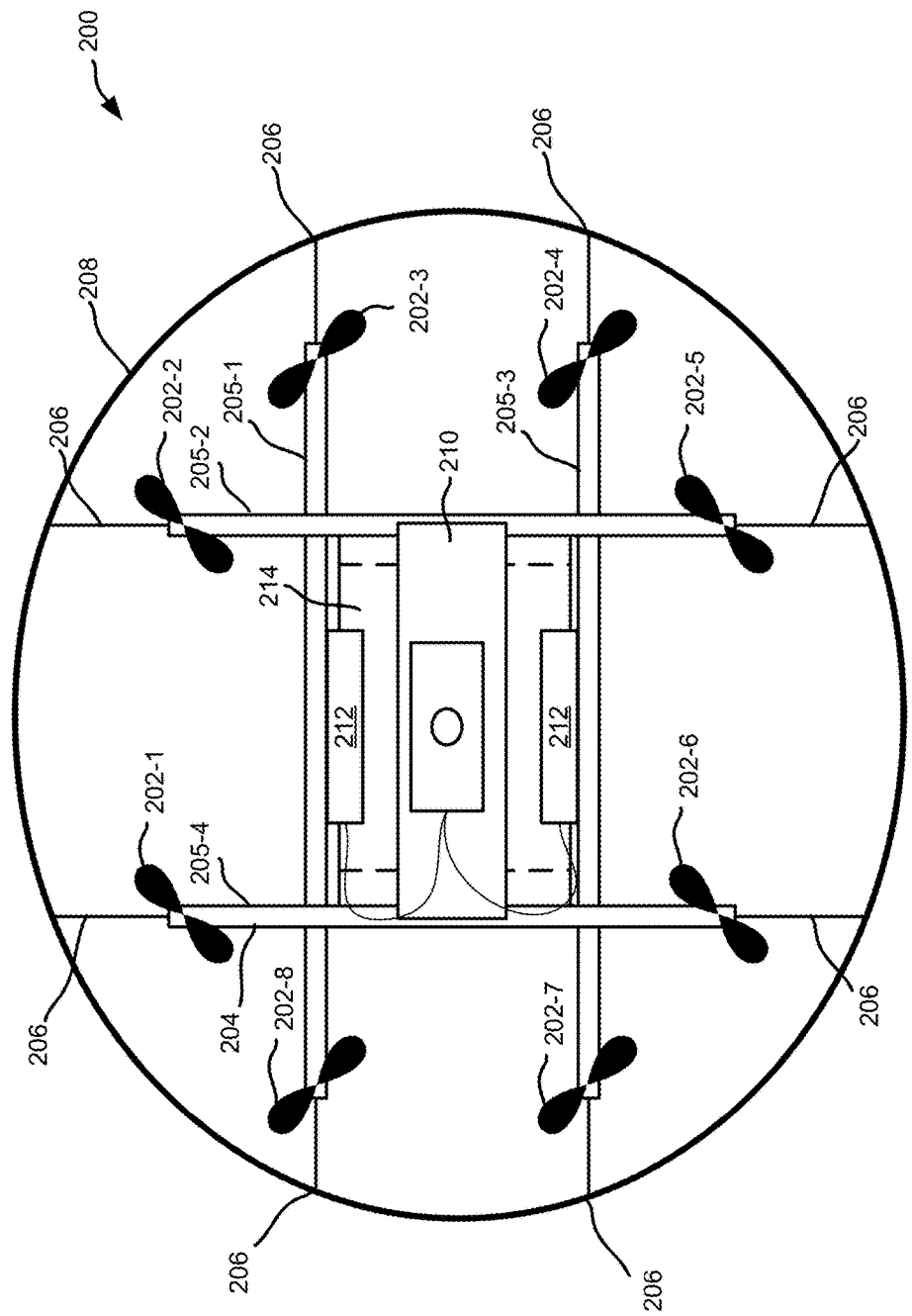
FIG. 2 depicts a block diagram of a top-down view of an example automated mobile vehicle, according to an implementation.
Figure 3:
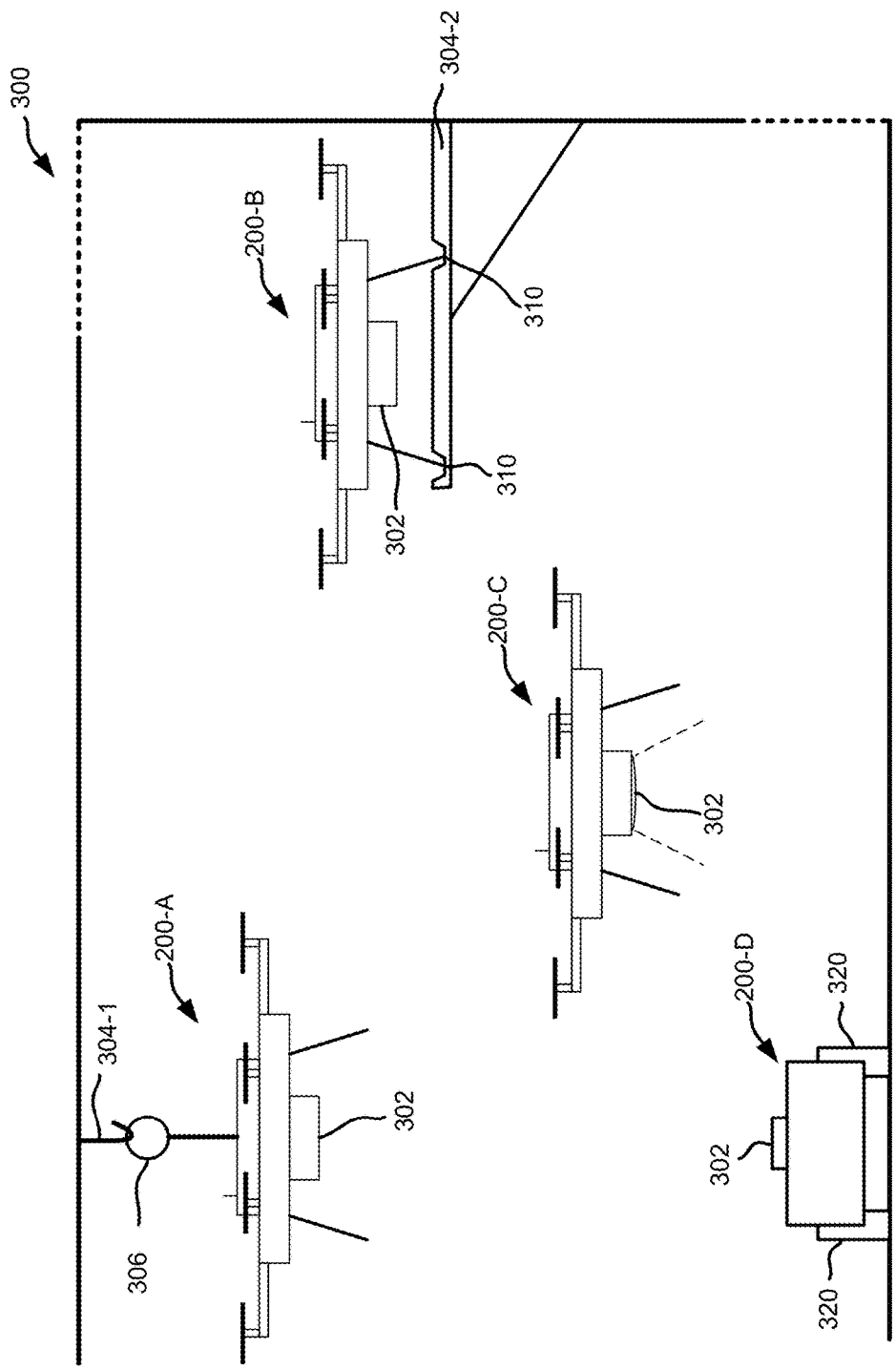
FIG. 3 depicts a block diagram of various automated mobile vehicles and recovery locations, according to an implementation.

FIG. 2 illustrates a block diagram of a top-down view of an AMV 200, according to an implementation. In the example of FIG. 2, the AMV is an aerial vehicle. In other implementations, the AMV may be ground and/or water based. For example, the AMV may be a mobile drive unit that utilizes wheels and a motor for propulsion, as illustrated in FIG. 3.

As illustrated in FIG. 2, the AMV 200 includes eight propellers 202-1, 202-2, 202-3, 202-4, 202-5, 202-6, 202-7, 202-8 spaced about the frame 204 of the AMV. The propellers 202 may be any form of propeller (e.g., graphite, carbon fiber) and of a size sufficient to lift the AMV 200 and any component (e.g., wireless network access point, light, speaker, camera, microphone) engaged by the AMV 200 so that the AMV 200 can navigate through the air to a position within an event area. While this example includes eight propellers, in other implementations, more or fewer propellers may be utilized. Likewise, in some implementations, the propellers may be positioned at different locations on the AMV 200. In addition, alternative methods of propulsion may be utilized for an aerial AMV 200. For example, fans, jets, turbojets, turbo fans, jet engines, and the like may be used to propel the AMV. Likewise, if the AMV is ground and/or water based, still other forms of propulsion may be utilized, such as, but not limited to, motors, wheels, tracks, arms, etc.

The frame 204 of the AMV 200 may likewise be of any suitable material, such as graphite, carbon fiber and/or aluminum. In this example, the frame 204 of the AMV 200 includes four rigid members 205-1, 205-2, 205-3, 205-4, or beams arranged in a hash pattern with the rigid members intersecting and joined at approximately perpendicular angles. In this example, rigid members 205-1 and 205-3 are arranged parallel to one another and are approximately the same length. Rigid members 205-2 and 205-4 are arranged parallel to one another, yet perpendicular to rigid members 205-1 and 205-3. Rigid members 205-2 and 205-4 are approximately the same length. In some embodiments, all of the rigid members 205 may be of approximately the same length while, in other implementations, some or all of the rigid members may be of different lengths. Likewise, the spacing between the two sets of rigid members may be approximately the same or different.

While the implementation illustrated in FIG. 2 includes four rigid members 205 that are joined to form the frame 204, in other implementations, there may be fewer or more components to the frame 204. For example, rather than four rigid members, in other implementations, the frame 204 of the AMV 200 may be configured to include six rigid members. In such an example, two of the rigid members 205-2, 205-4 may be positioned parallel to one another. Rigid members 205-1, 205-3 and two additional rigid members on either side of rigid members 205-1, 205-3 may all be positioned parallel to one another and perpendicular to rigid members 205-2, 205-4. With additional rigid members, additional cavities with rigid members on all four sides may be formed by the frame 204. As discussed further below, a cavity within the frame 204 may be configured to include a component for use in replacing an inoperable infrastructure component.

In some implementations, the AMV may be configured for aerodynamics. For example, an aerodynamic housing may be included on the AMV that encloses the AMV control system 210, one or more of the rigid members 205, the frame 204 and/or other components of the AMV 200. The housing may be made of any suitable material(s), such as graphite, carbon fiber, aluminum, etc. Likewise, in some implementations, the location and/or the shape of the component(s) (e.g., light, camera, microphone, speaker, wireless network access point) may be aerodynamically designed. In some implementations, the AMV may be configured to removably couple with a component (e.g., camera, speaker, microphone, light) such that the same AMV may be able to transport and utilize different components.

The propellers 202 and corresponding propeller motors are positioned at both ends of each rigid member 205. The propeller motors may be any form of motor capable of generating enough speed with the propellers to lift the AMV 200 and any coupled component thereby enabling aerial transport of the component. For example, the propeller motors may each be a FX-4006-13 740 kv multi rotor motor.

Extending outward from each rigid member is a support arm 206 that is connected to a safety barrier 208. In this example, the safety barrier is positioned around and attached to the AMV 200 in such a manner that the motors and propellers 202 are within the perimeter of the safety barrier 208. The safety barrier may be plastic, rubber, etc. Likewise, depending on the length of the support arms 206 and/or the length, number or positioning of the rigid members 205, the safety barrier may be round, oval, or any other shape.

Mounted to the frame 204 is the AMV control system 210. In this example, the AMV control system 210 is mounted in the middle and on top of the frame 204. The AMV control system 210, as discussed in further detail below with respect to FIG. 8, controls the operation, navigation, and/or communication of the AMV 200.

Likewise, the AMV 200 includes one or more power modules 212. In this example, the AMV 200 includes two power modules 212 that are removably mounted to the frame 204. The power modules for the AMV may be in the form of battery power, solar power, gas power, super capacitor, fuel cell, alternative power generation source, or a combination thereof. For example, the power modules 212 may each be a 6000 mAh battery. The power module(s) 212 are coupled to and provide power for the AMV control system 210 and the propeller motors.

In some implementations, one or more of the power modules may be configured such that it can be autonomously removed and/or replaced with another power module while the AMV is at a recovery location (discussed below). For example, when the AMV lands at a recovery location, the AMV may engage with a charging member at the recovery location that will recharge the power module.

As noted above, in some implementations, the AMV may be configured to removably couple with one or more components. For example, the AMV may have a latch or other attachment mechanism 214 that allows the AMV to autonomously couple and/or decouple with different components. In some implementations, the attachment mechanism may provide power or other connectivity to the component. Alternatively, the component may be configured to operate under its own power. The attachment mechanism may be, for example, positioned within a cavity formed by the rigid members such that, when a component is coupled with the AMV, it is at least partially surrounded or positioned beneath the cavity.

While the implementations of the AMV discussed herein utilize propellers to achieve and maintain flight, in other implementations, the AMV may be configured in other manners. For example, the AMV may include fixed wings and/or a combination of both propellers and fixed wings. For example, the AMV may utilize one or more propellers to enable takeoff and landing and a fixed wing configuration or a combination wing and propeller configuration to sustain flight while the AMV is airborne. Alternatively, or in addition thereto, the AMV may be configured for ground and/or water movement.

FIG. 3 depicts a block diagram of various automated mobile vehicles and recovery locations, according to an implementation. The block diagram illustrates side views of different AMVs 200. As illustrated, each of the AMVs may include or otherwise be coupled with a component 302. The component 302 may be any component that may be transported by an AMV for use within an event area. For example, the component may be a light, speaker, microphone, projector, camera, etc.

As illustrated by AMVs 200-A, 200-B and 200-C, the AMVs may be aerial AMVs that utilize propellers, wings, etc., to achieve flight to allow navigation to a position within an event location. Likewise, an AMV may position itself at a recovery location and/or maintain a position that is not at a recovery location to provide coverage in the event area. For example, AMV 200-A is docked at a recovery location 304-1. In this example, the recovery location 304-1 is in the form of a hook 304-1 that extends from a ceiling or other overhead structure of a materials handling facility 300. In such an example, the AMV 200-A may have an arm 306 or other protrusion that can be engaged with the recovery location 304-1 to secure the AMV 200-A to the recovery location 304-1. Likewise, the recovery location 304-1 and the arm 306 may be configured such that the power modules of the AMV 200-A can be charged while the AMV 200-A is docked at the recovery location 304-1. For example, in some implementations, there is an electrical connection between the recovery location 304-1 and the arm 306 that allows an electric charge to be applied to the power module(s) of the AMV. Alternatively, the charging may be provided using inductive, or other form of non-contact based charging. Likewise, the recovery location may also be configured to provide wired network connectivity to the AMV 200-A while the AMV is docked at the recovery location 304-1.

Recovery location 304-2 is another example of a recovery location where an AMV 200-B may land. In this example, the recovery location 304-2 is in the form of a shelf or ledge attached to a vertical wall or support within a materials handling facility 300. The recovery location 200-B may have one or more mating members 310 that are configured to receive the landing arms of the AMV. In such an example, the mating members may be separated a distance approximately equal to the landing arms of the AMV so that, when the AMV lands at the recovery location, the landing arms fit within the mating members.

Likewise, in some implementations, one or more sides of the mating members may be angled inward to assist in the proper positioning of the AMV at the recovery location. When an AMV is at the recovery location, the recovery location may be configured to provide an electrical charge from the mating members into the landing arms of the AMV. The landing arms may likewise be engaged with the power modules to enable autonomous charging of the power modules while the AMV is at the recovery location. Likewise, the landing arms may be coupled to the component thereby enabling power and/or connectivity to be provided to the component. Similar to the recovery location 304-1, the recovery location 304-2 may be configured to provide power and/or network connectivity to the AMV 200. In other implementations, charging, power and/or other connections may be provided wirelessly.

In still another example, as illustrated by AMV 200-C, the AMV may maintain a position under its own power. For example, if there is no recovery location or other landing area at or near the position within the event area where the AMV is to be located (destination position), the AMV may maintain the position using its own power. In this example, the AMV 200-C is hovering at a defined altitude at a destination position within the event area. From this destination position, the AMV 200-C can provide coverage using the coupled component 302.

Finally, AMV 200-D illustrates an example of a ground based AMV, in this example a mobile drive unit. The mobile drive unit may be configured in a manner similar to other AMVs 200, such as that discussed above with respect to FIG. 2. However, rather than utilizing propellers to achieve flight for use in navigating the AMV to a destination position within the event location, the AMV 200-D may utilize one or more wheels 320 that may be rotated by the motor to propel the AMV across the ground and navigate the AMV 200-D to a destination position within an event area. Similar to recovery locations used for aerial AMVs, recovery locations may be positioned within the materials handling facility 300 at locations that allow a ground based AMV 200-D and/or an aerial AMV 200-A, 200-B, 200-C to dock, land or otherwise position itself at or on the recovery location. For example, a recovery location may be on the floor of the materials handling facility 300 such that the AMV 200-D can position itself on the recovery location and receive power, recharge batteries, obtain network connectivity, etc.

In some implementation, a materials handling facility 300 or other indoor environment may include one or more recovery locations, such as recovery locations 304-1, 304-2 positioned at different locations within the materials handling facility 300. If an infrastructure component becomes inoperable, an AMV can be deployed to the recovery location 304 nearest the inoperable infrastructure component and the AMV can replace the inoperable component while docked at the recovery location. If there is not a nearby recovery location such that the entire area affected by the event (event area) can be serviced by a single AMV 200, multiple recovery locations and AMVs may be used to replace the inoperable infrastructure component. For example, if a wireless network access point positioned between two recovery locations becomes inoperable and a single AMV located at one of the recovery locations cannot provide wireless network coverage that will encompass the area previously serviced by the now inoperable infrastructure component, multiple AMVs may be deployed to different recovery locations so that collectively they can provide coverage to the entire affected area. Alternatively, a single AMV may be dispatched to the location of the inoperable component and maintain a position (e.g., hover) under its own power to provide coverage to the event area. In such an example, or in instances where there is no nearby recovery location, the AMV may determine how much power is needed for the AMV to return to a recovery location, identify another AMV that is available and capable of taking its place (providing relief) and provide a notification to that other AMV to provide relief by a defined time. The process for providing relief to AMVs is discussed further below with respect to FIG. 7.

Figure 4:
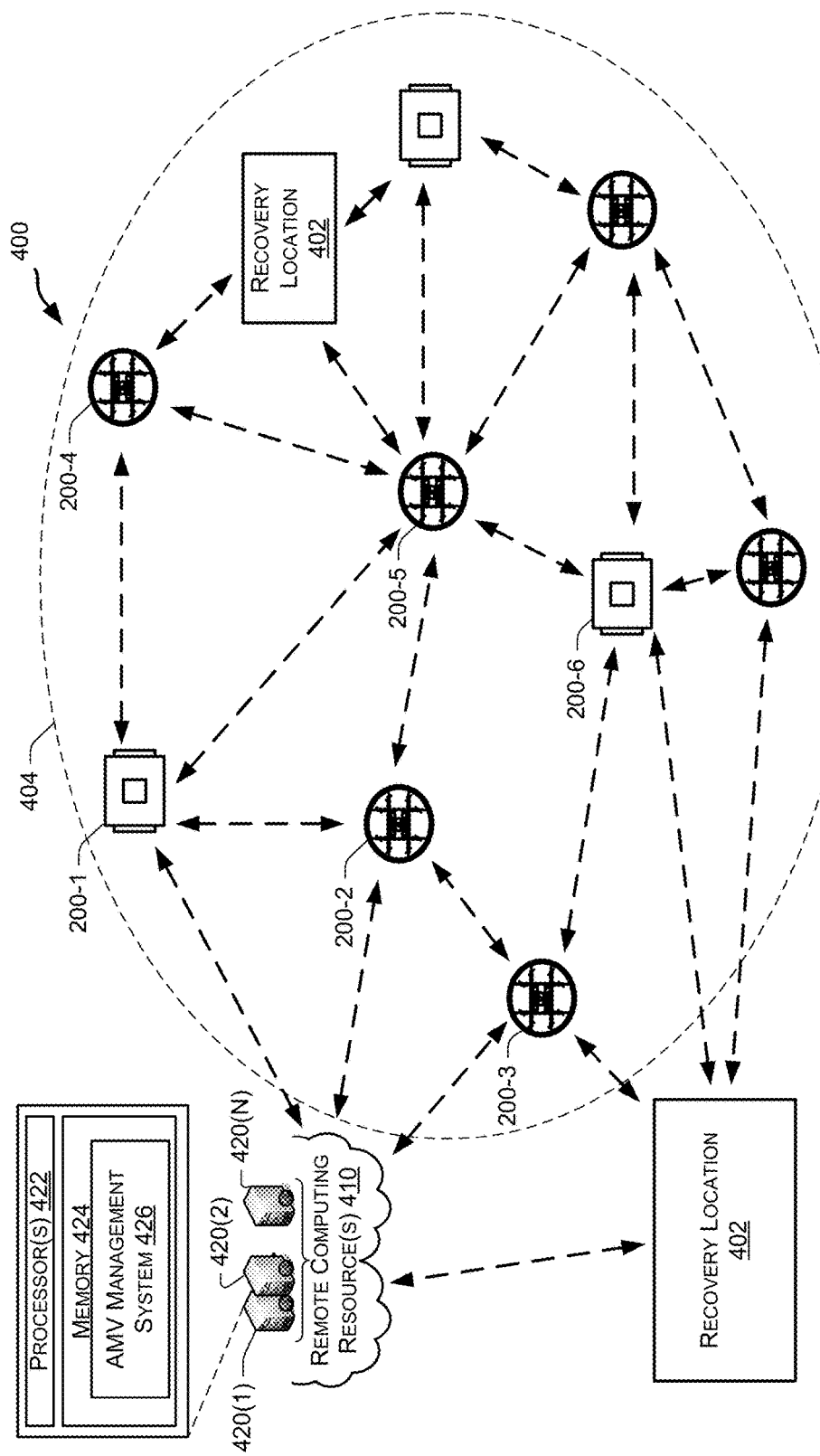
FIG. 4 depicts a block diagram of an automated mobile vehicle environment, according to an implementation.

FIG. 4 depicts a block diagram of an AMV environment 400 that includes AMVs 200, recovery locations 402, and remote computing resources 410, according to an implementation. The AMV environment 400 may be an indoor environment, such as in a materials handling facility, an outdoor environment, or a combination of both. Each of the AMVs 200, recovery locations 402, and/or remote computing resources 410 may be configured to communicate with one another. For example, the AMVs 200 may be configured to form a wireless mesh network that utilizes Wi-Fi or another wireless means of communication, each AMV communicating with other AMVs within wireless range. In other implementations, the AMVs 200, AMV management system 426, and/or recovery locations 402 may utilize existing wireless networks (e.g., cellular, Wi-Fi, satellite) to facilitate communication. Likewise, the remote computing resources 410, and/or recovery locations 402, may also be included in the wireless mesh network. In some implementations, one or more of the remote computing resources 410, and/or recovery locations 402, may also communicate with each other via another network (wired and/or wireless), such as the Internet.

The remote computing resources 410 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 410 may include one or more servers, such as servers 420(1), 420(2), . . . , 420(N). These servers 420(1)-(N) may be arranged in any number of ways, such as server farms, stacks, and the like that are commonly used in data centers. Furthermore, the servers 420(1)-(N) may include one or more processors 422 and memory 424 which may store an AMV management system 426.

The AMV management system 426 may be configured, for example, to communicate with the recovery locations 402, AMVs 200, materials handling facilities and/or other facilities.

When a message, such as a deployment message, relief instruction, etc., is sent to or from an AMV, the message may include an identifier for the AMV and each AMV may act as a node within the network, forwarding the message until it is received by the intended AMV. For example, the AMV management system 426 may send a message to AMV 200-6 by transmitting the message and the identifier of the intended receiving AMV to one or more of AMVs 200-1, 200-2, 200-3, 200-4 that are in wireless communication with the AMV management system 426. Each receiving AMV will process the identifier to determine if it is the intended recipient and then forward the message to one or more other AMVs that are in communication with the AMV. For example, AMV 200-2 may forward the message and the identification of the intended receiving AMV to AMV 200-1, 200-3 and 200-5. In such an example, because AMV 200-3 has already received and forwarded the message, it may discard the message without forwarding it again, thereby reducing load on the wireless mesh network 404. The other AMVs, upon receiving the message, may determine that they are not the intended recipient and forward it on to other nodes. This process may continue until the message reaches the intended recipient.

In some implementations, if an AMV loses communication with other AMVs via the wireless mesh network, it may activate another wireless communication path to regain connection. For example, if an AMV cannot communicate with any other AMVs via the mesh network 404, it may activate a cellular and/or satellite communication path to obtain communication information from the AMV management system 426, and/or a recovery location 402. If the AMV still cannot regain communication and/or if it does not include an alternative communication component, it may automatically and autonomously navigate toward a recovery location 402.

The wireless mesh network 404 may be used to provide communication between AMVs (e.g., to share weather information, environment information, location information, routing information, recovery locations, relief instructions), the AMV management system 426, materials handling facilities, and/or recovery locations 402. Likewise, in some implementations, the wireless mesh network may be used to provide coverage for other computing resources, such as personal computers, electronic book reading devices, audio players, mobile telephones, tablets, desktops, laptops, etc. For example, the wireless mesh network 404 may be used to replace an inoperable wireless network within a materials handling facility.

As illustrated in FIG. 4, different types of AMVs may be utilized together to provide coverage to the event area. For example, some of the AMVs, such as AMV 200-2, 200-3, may be aerial AMVs and some of the AMVs, such as AMVs 200-1, 200-6 may be ground based AMVs.

Figure 5:
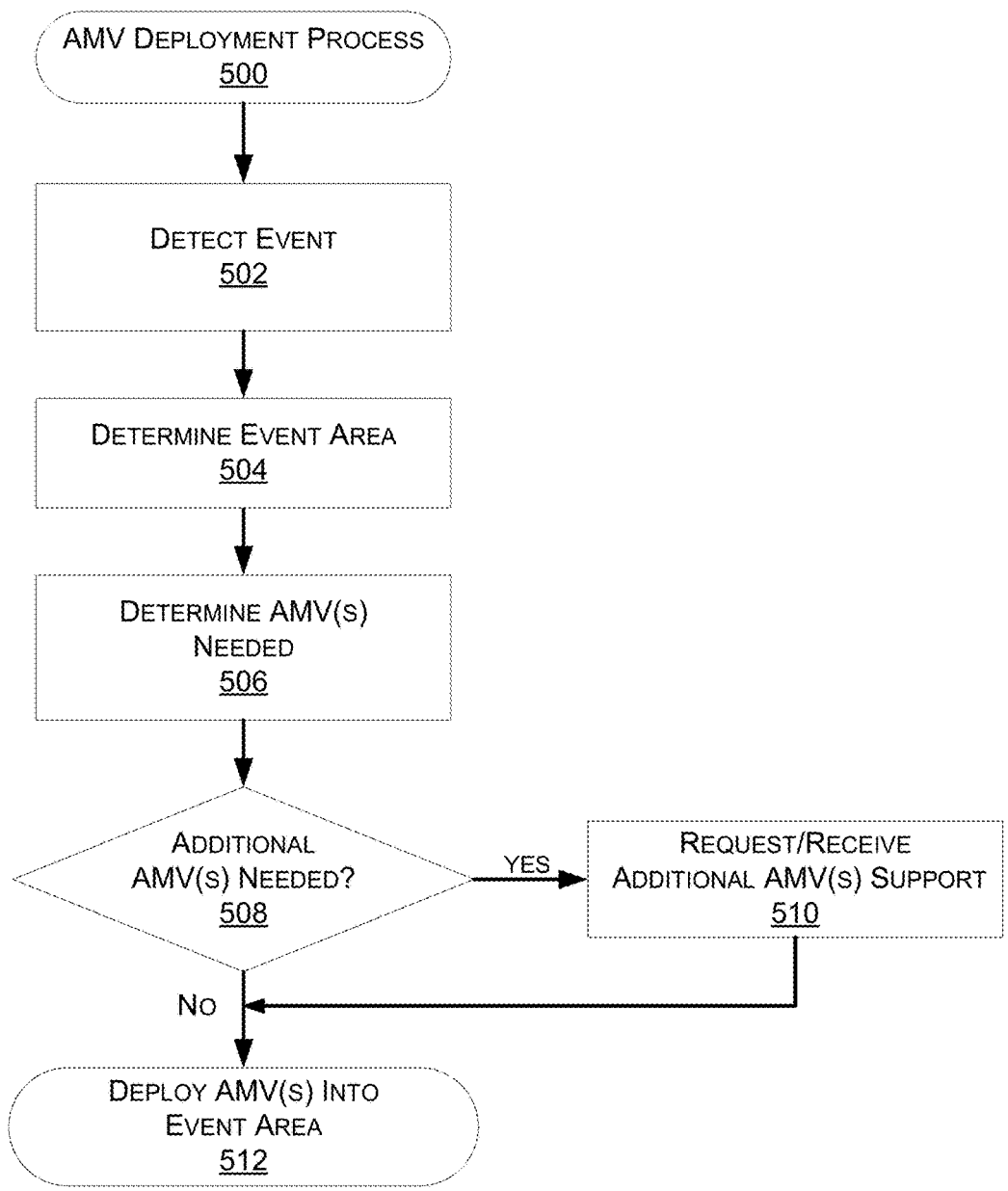
FIG. 5 is a flow diagram illustrating an example automated mobile vehicle deployment process, according to an implementation.

FIG. 5 is a flow diagram illustrating an example AMV deployment process 500, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins upon detection of an event, as in 502. An event, as described herein, may be a detected inoperability of an infrastructure component and/or a need for an infrastructure component at a location where one is not currently available. For example, an event may occur due to a power outage resulting in the lighting and/or network connectivity becoming inoperable. As another example, an event may be a gathering of a large number of people in a park such that infrastructure components (e.g., lighting, audio, video) should be provided.

Upon detection of an event, an event area and an event boundary are determined, as in 504. An event area may be an area affected by the inoperable infrastructure component(s). For example, if a light within a materials handling facility goes out, the event area may be a defined area surrounding the inoperable infrastructure component. Alternatively, the event area may be determined by one or more input components (e.g., on an AMV or elsewhere) that can measure one or more inputs to identify the area affected by the inoperable infrastructure component(s). For example, a light sensor (input component) may be used to measure the light and determine an event area based on the amount of measured light. As another example, if a wireless network access point becomes inoperable, an input device may be used to measure the strength of the wireless signal from neighboring wireless network access points to identify areas that no longer have connectivity with the wireless network. The event area boundary may be the perimeter surrounding the event area.

Based on the event area and the event area boundary, a determination may be made as to how many AMVs are needed to replace or provide coverage, as in 506. For example, a coverage area may be associated with each AMV for particular components identifying the area that can be covered by the component coupled with the AMV. If the coverage area of the AMV is smaller than the event area, multiple AMVs may be needed to provide coverage for the inoperable infrastructure component.

Likewise, in some implementations, it may be determined whether there are recovery locations in or near the event area at which the AMVs can dock and provide coverage. In some instances, even though one AMV could provide coverage to the entire area by hovering at a specific position, it may be determined to deploy two or more AMVs that can dock at nearby recovery locations and collectively provide coverage to the area. In such an instance, the docked AMVs can provide coverage for a longer period of time than a single AMV that is having to maintain position under its own power.

Based on the number of AMVs needed, a determination may be made as to whether additional AMVs than what are available are needed, as in 508. For example, if a particular segment of a materials handling facility only has three AMVs available, the lighting goes out and it is determined that five AMVs are needed to provide coverage to the event area, it may be determined that additional AMVs are needed. If it is determined that additional AMVs are needed, additional AMVs may be requested and optionally additional AMVs may be received, as in 510. However, if it is determined that additional AMVs are not needed, the available AMVs are deployed into the event area, as in 512. Likewise, available AMVs may be deployed into the event area after requesting additional AMVs. For example, instructions may be provided to the available AMVs to navigate into the event area and provide the needed coverage (e.g., wireless network, lighting, audio). In some implementations, the instructions may also instruct the AMV to couple with a particular infrastructure component prior to navigating to the event area. For example, if a wireless network access point is needed in the event area, the instructions to deploy into the event area may also instruct the AMV to couple with a wireless network access point.

As the AMVs are deployed into the event area, they may receive instructions as to where in the event area they are to be positioned (destination position). Alternatively, the AMVs may receive instructions identifying the event boundary and the AMVs may determine where each is to be positioned within the event area.

Figure 6:
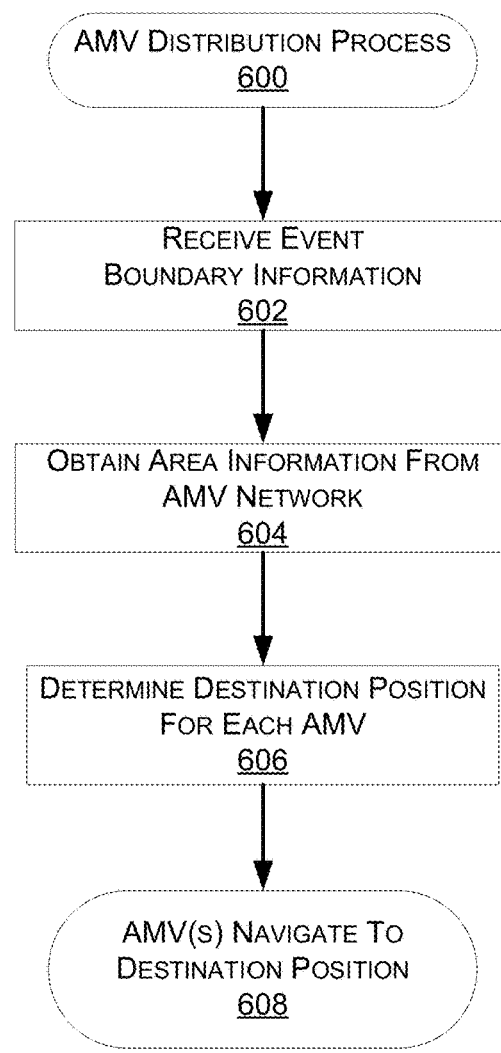
FIG. 6 is a flow diagram illustrating an example automated mobile vehicle distribution process, according to an implementation.

For example, FIG. 6 is an example process 600 for distributing AMVs into an event area, according to an implementation. The example process 600 begins by receiving event boundary information, such as those determined as part of the example process 500, as in 602. Based on the event boundary, relevant area information may be obtained from the AMV mesh network, such as the mesh network discussed above with respect to FIG. 4, as in 604. For example, information regarding infrastructure coverage currently being provided by other AMVs in the event area, areas with poor coverage, weather within the event area, location of other AMVs in the event area, relief requests from other AMVs in the area, dangerous areas, etc., may be obtained from the AMV network. Based on the event area boundary and the area information obtained from the AMV network, a destination position for the AMV within the event area and route from the current location of the AMV to that destination position is determined, as in 606. For example, the AMV may be at a recovery location that is external to the event area and thus may be required to navigate to the destination position within the event area. In some implementations, the route may only include route information (e.g., general directions from the current location to the destination position). In other implementations, the route may also include altitude, speed and/or other information about the route.

Once the route and destination position are determined, the AMV(s) may follow the determined route to the determined destination position within the event area, as in 608. In some implementations, the specific navigation of the route may be determined by the AMV during traversal of the route. As the route is followed, the status of the AMV may be periodically reported to the AMV management system. For example, the position on the route, trajectory, speed, altitude, etc., may be periodically reported to the AMV management system.

As the AMV traverses the route, the AMV may be in constant or periodic communication with other AMVs, the AMV management system, materials handling facilities and/or recovery locations, receiving and/or providing updates regarding the environment and/or other information.

Figure 7:
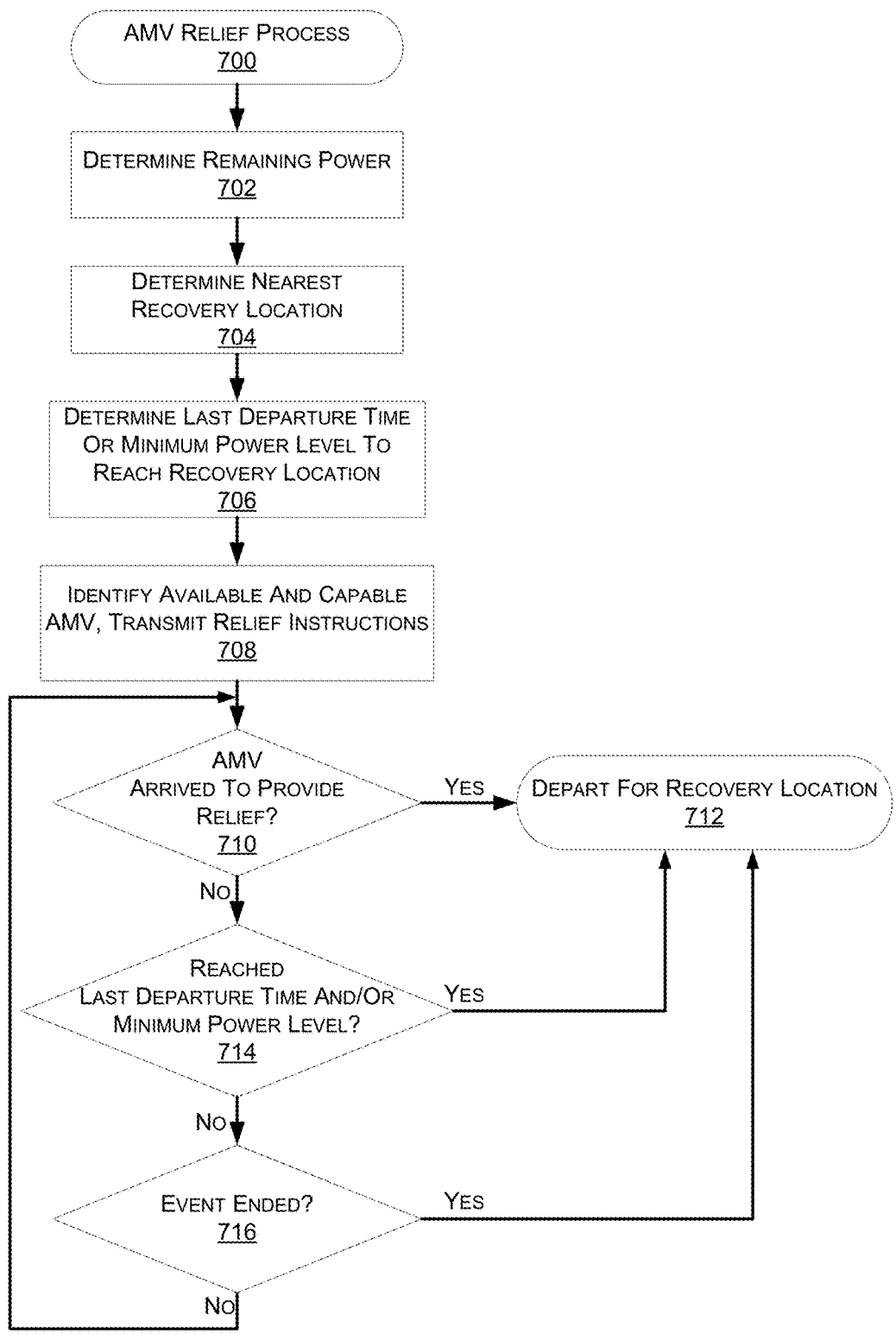
FIG. 7 is a flow diagram illustrating an example automated mobile vehicle relief process, according to an implementation.

FIG. 7 is a flow diagram illustrating an example AMV relief process 700, according to an implementation. The example process 700 begins by determining the remaining power of a first AMV that is deployed at a destination position within an event area and operating under its own power, as in 702. For example, if a first AMV has navigated to a destination position within an event area, it consumed power to reach the destination position. In some implementations, the remaining power may be determined based on the total power available when the first AMV departed for the destination position compared to the power currently available. In another implementation, rather than determining the remaining power, it may be determined how much power was consumed to reach the destination position. In other implementations, the AMV may monitor its own remaining power and/or power consumption and provide power related information back to the AMV management system. In still other implementations, a first AMV may transport a second AMV to the destination position such that the second AMV has full power when it reaches the destination position. The first AMV, after delivering the second AMV to the destination position, may return to a recovery location and/or perform another action.

In addition to determining the remaining power, the location of the nearest recovery location may be determined, as in 704. In some implementations, the AMVs may know the location of recovery locations. In other implementations, the recovery locations may provide or transmit an identifier that includes location information and capabilities of the recovery location (e.g., charging, parts, service). In still other implementations, the first AMV may identify the recovery location from which it originally deployed as the nearest recovery location.

Based on the determined remaining power and the determined nearest recovery location, the last departure time for the AMV can be determined, as in 706. The last departure time represents the latest time by which the first AMV can depart the destination position and reach the recovery location without losing power. The last departure time may be determined based on the amount of power required to reach the destination position, the distance traveled to reach the destination position, the rate at which power is being consumed to provide the coverage or maintain position at the destination position, the distance to be traveled to reach the recovery location and/or the amount of power anticipated to be consumed to reach the recovery location. Based on this information, the example process can determine the time at which the first AMV will have the minimum amount of power needed to reach the recovery location from the destination location. In other implementations, rather than determining the last departure time, the example process 700 may determine a minimum power level needed for the first AMV to reach the recovery location without losing power. Similar to the last departure time, the minimum power level may be determined based on the amount of power needed to reach the recovery location. The amount of power needed to reach the recovery location may be determined based on the rate at which power is consumed by the AMV when in transit and the distance between the destination position and the recovery location.

Based on the determined last departure time and/or the minimum power level, the example process 700 may identify a second AMV that is or will be available to provide relief to the first AMV and that is capable of providing the coverage provided by the first AMV, as in 708. This may include identifying a specific AMV that will replace the first AMV or providing a notification to all AMVs that the first AMV at the destination position will need to be replaced by the departure time and/or before it reaches the minimum power level. If a specific AMV is identified as the second AMV, the second AMV may receive instructions to arrive at the destination position before the last departure time or prior to the first AMV reaching its minimum power level. In implementations where a notice is sent out to all AMVs, the AMV that responds first as being available and capable of providing relief to the first AMV may be instructed to arrive at the destination position.

The example process 700 continues by determining if a second AMV has arrived at the destination position to provide relief, as in 710. In some implementations, the second AMV may transmit a notification of its position and the notification may be used to determine if the second AMV has arrived at the destination position. If it is determined that the second AMV has arrived at the destination position to provide relief to the first AMV, the first AMV may depart for a recovery location, as in 712.

However, if it is determined that the second AMV has not arrived at the destination position, a determination may be made as to whether the last departure time and/or the minimum power level for the first AMV has been reached, as in 714. If it is determined that the last departure time and/or the minimum power level has been reached, the example process returns to block 712, and the first AMV departs for the recovery location. If it is determined that the last departure time and/or the minimum power level has not been reached, a determination may be made as to whether the event has ended, as in 716. The event may end, for example, if the inoperable infrastructure equipment returns to an operating mode. For example, if the lights had gone out (inoperable infrastructure equipment) but have been restored (operable infrastructure equipment), it may be determined that the event has ended. If it is determined that the event has ended, the example process 700 returns to block 712 and the AMV returns to a recovery location. However, if it is determined that the event has not ended, the example process 700 returns to decision block 710 and continues.

Figure 8:
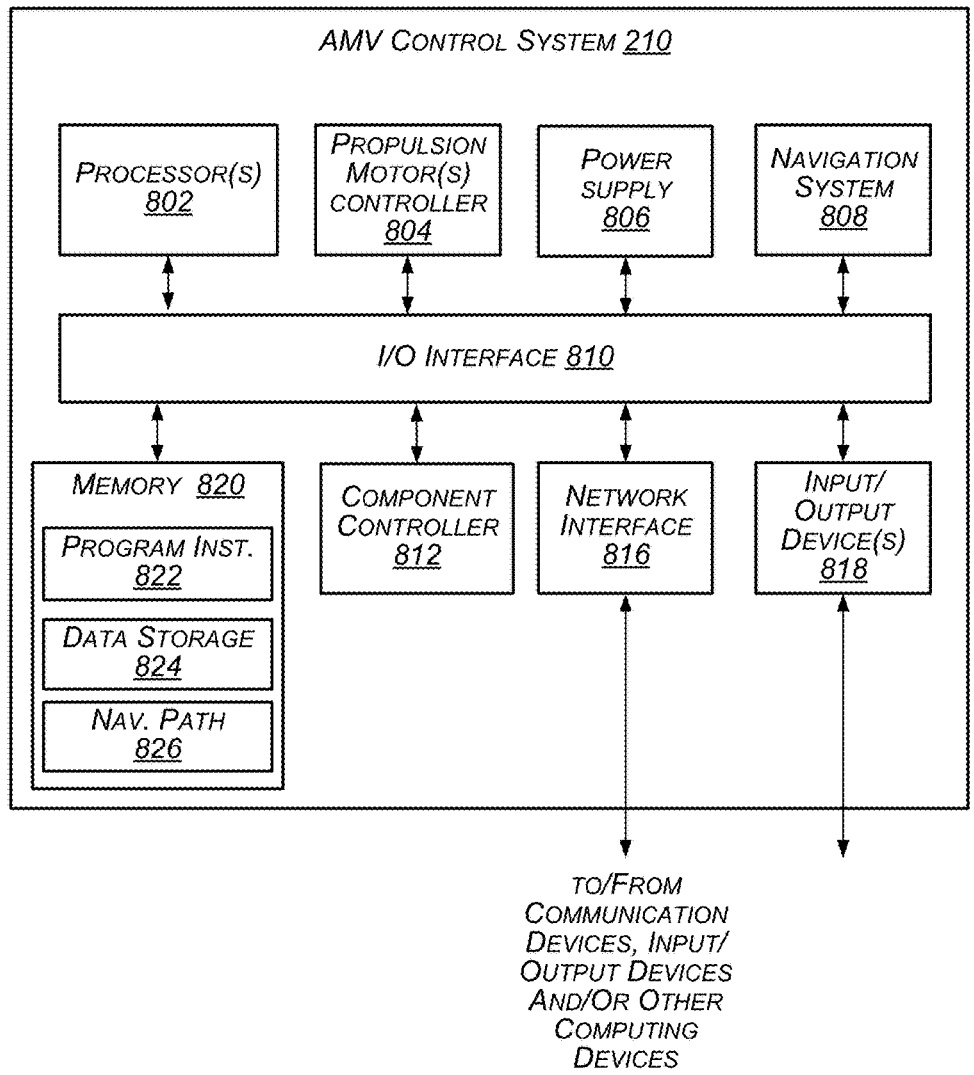
FIG. 8 is a block diagram illustrating various components of an automated mobile vehicle control system, according to an implementation.

FIG. 8 is a block diagram illustrating an example AMV control system 210 of the AMV 200. In various examples, the block diagram may be illustrative of one or more aspects of the AMV control system 210 that may be used to implement the various systems and methods discussed above. In the illustrated implementation, the AMV control system 210 includes one or more processors 802, coupled to a non-transitory computer readable storage medium 820 via an input/output (I/O) interface 810. The AMV control system 210 may also include a propulsion motor controller 804, power module 806 and/or a navigation system 808. The AMV control system 210 further includes a component controller 812, a network interface 816, and one or more input/output devices 818. The component controller 812 may be configured to control the coupling and/or decoupling of components with the AMV 200. Likewise, the component controller 812 may further be configured to provide power, connectivity and/or control of a coupled component.

In various implementations, the AMV control system 210 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, navigation paths and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and navigation path data 826, respectively. In other implementations, program instructions, data and/or navigation paths may be received, sent or stored upon different types of computer-accessible media, such as non-transitory media, or on similar media separate from the non-transitory computer readable storage medium 820 or the AMV control system 210. Generally speaking, a non-transitory, computer readable storage medium may include storage media or memory media such as magnetic or optical media, e.g., disk or CD/DVD-ROM, coupled to the AMV control system 210 via the I/O interface 810. Program instructions and data stored via a non-transitory computer readable medium may be transmitted by transmission media or signals such as electrical, electromagnetic, or digital signals, which may be conveyed via a communication medium such as a network and wireless mesh network, and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface 810 or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The propulsion motor(s) controller 804 communicates with the navigation system 808 and adjusts the power of each motor to guide the AMV along a determined navigation path to a destination position or a recovery location. The navigation system 808 may include a global positioning system ("GPS"), indoor positioning system, or other similar system than can be used to navigate the AMV to and/or from a destination position and/or a recovery location. The component controller 812 communicates with a latch or motor(s) (e.g., a servo motor) used to couple or decouple components (e.g., lights, cameras, microphones, speakers, wireless network access points) with the AMV.

The network interface 816 may be configured to allow data to be exchanged between the AMV control system 210, other devices attached to a network, such as other computer systems, and/or with AMV control systems of other AMVs. For example, the network interface 816 may enable wireless communication between numerous AMVs that are providing infrastructure coverage within the event area. In various implementations, the network interface 816 may support communication via wireless general data networks, such as a Wi-Fi network. For example, the network interface 816 may support communication via telecommunications networks, such as cellular communication networks, satellite networks, and the like.

Input/output devices 818 may, in some implementations, include one or more displays, image capture devices, thermal sensors, infrared sensors, time of flight sensors, accelerometers, pressure sensors, weather sensors, etc. Multiple input/output devices 818 may be present and controlled by the AMV control system 210. One or more of these sensors may be utilized to assist in the landing as well as avoiding obstacles during navigation and/or engagement of components. For example, utilizing a location signal from the GPS receiver and one or more IR sensors, the AMV may safely land or dock at a recovery location. The IR sensors may be used to provide real-time data to assist the AMV in avoiding obstacles.

As shown in FIG. 8, the non-transitory computer readable storage medium 820 may include program instructions 822 which may be configured to implement the example processes and/or sub-processes described above. The data storage 824 may include various data stores for maintaining data items that may be provided for determining navigation paths, docking, landing, providing coverage, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AMV control system 210 is merely illustrative and is not intended to limit the scope of the present disclosure. In particular, the computing system and devices may include any combination of hardware or software that can perform the indicated functions, including computers, network devices, etc. The AMV control system 210 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AMV control system. Some or all of the system components or data structures may also be stored (e.g., as instructions or structured data) on a non-transitory, computer-accessible medium or a portable article to be read by an appropriate drive. In some implementations, instructions stored on a computer-accessible medium separate from AMV control system 210 may be transmitted to AMV control system 210 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AMV control system configurations.

Figure 9:
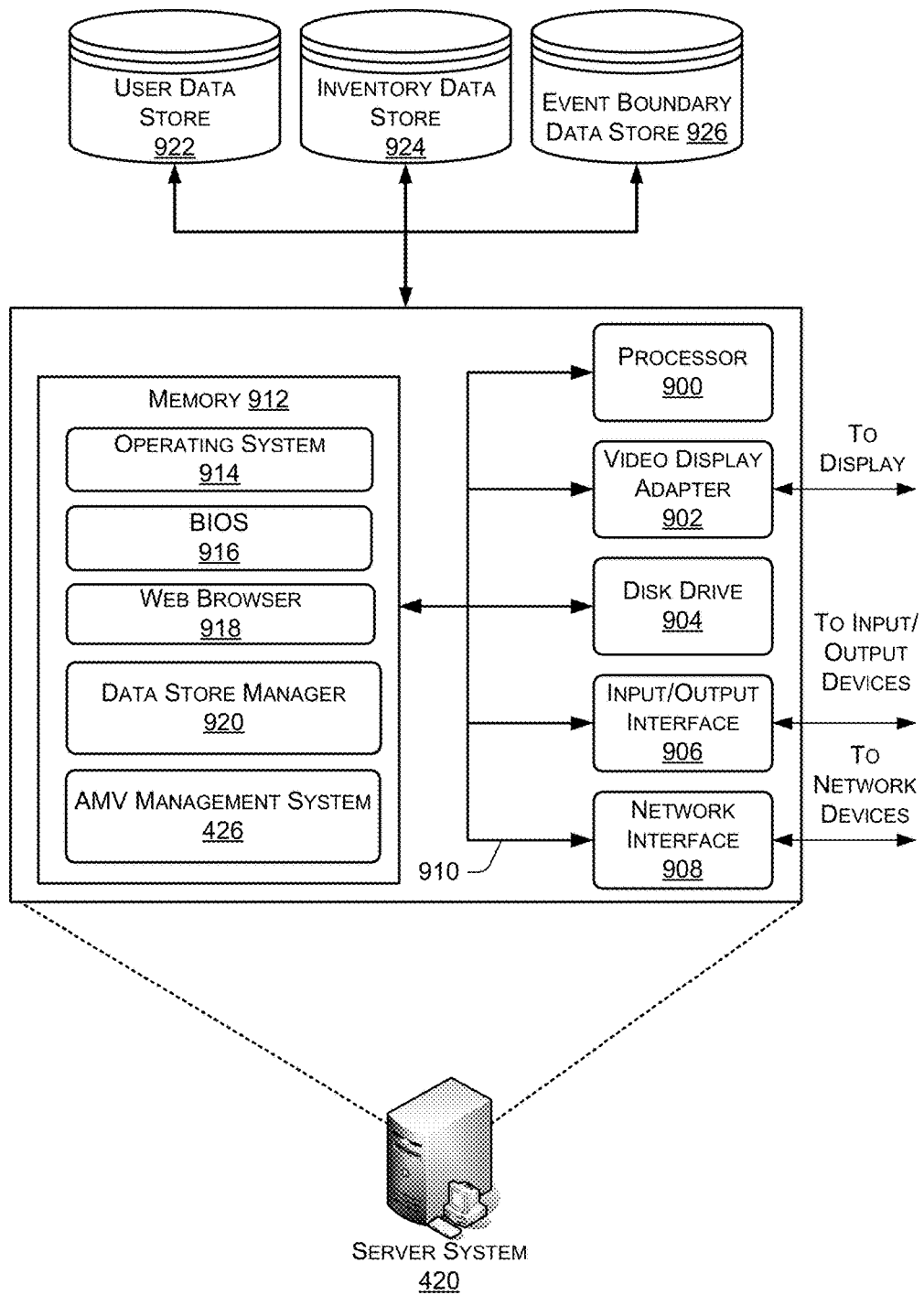
FIG. 9 is a block diagram of an illustrative implementation of a server system that may be used with various implementations.

FIG. 9 is a pictorial diagram of an illustrative implementation of a server system, such as the server system 420, that may be used in the implementations described herein. The server system 420 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 420 to monitor and configure operation of the server system 420. The input/output interface 906 likewise communicates with external input/output devices not shown in FIG. 9, such as a mouse, keyboard, scanner, or other input and output devices that can be operated by an operator of the server system 420. The network interface 908 includes hardware, software, or any combination thereof, to communicate with other computing devices. For example, the network interface 908 may be configured to provide communications between the server system 420 and other computing devices, such as an AMV, materials handling facility, and/or recovery locations, as shown in FIG. 4.

The memory 912 generally comprises random access memory (RAM), read-only memory (ROM), flash memory, and/or other volatile or permanent memory. The memory 912 is shown storing an operating system 914 for controlling the operation of the server system 420. A binary input/output system (BIOS) 916 for controlling the low-level operation of the server system 420 is also stored in the memory 912.

The memory 912 additionally stores program code and data for providing network services to the AMV management system 426. Accordingly, the memory 912 may store a browser application 918. The browser application 918 comprises computer executable instructions that, when executed by the processor 900, generate or otherwise obtain configurable markup documents such as Web pages. The browser application 918 communicates with a data store manager application 920 to facilitate data exchange between the inventory data store 924, the user data store 922, and/or event boundary data store 926, and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 420 can include any appropriate hardware and software for integrating with the data stores 922-926 as needed to execute aspects of one or more applications for the AMV management system, AMVs, materials handling facilities, and/or recovery locations.

The data stores 922-926 can include several separate data tables, databases or other data storage mechanisms and media for storing data relating to a particular aspect. For example, the data stores 922-926 illustrated include mechanisms for component information, AMV information, event information, weather information, route information, destination position information, etc., which can be used to generate and deliver information to the AMV management system 426, materials handling facilities, AMVs, recovery locations, and/or users.

It should be understood that there can be many other aspects that may be stored in the data stores 922-926. The data stores 922-926 are operable, through logic associated therewith, to receive instructions from the server system 420 and obtain, update or otherwise process data in response thereto.

The memory 912 may also include the AMV management system 426, discussed above. The AMV management system 426 may be executable by the processor 900 to implement one or more of the functions of the server system 420. In one implementation, the AMV management system 426 may represent instructions embodied in one or more software programs stored in the memory 912. In another implementation, the AMV management system 426 can represent hardware, software instructions, or a combination thereof.

The server system 420, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method, comprising:
   determining, by a processor, a remaining power of a first automated mobile vehicle ("AMV") that is operating and at a first location;
   determining, by the processor, a recovery location;
   determining at least one of:
      a last departure time by which the first AMV must depart the first location to travel to the recovery location without having insufficient power to travel the recover location, or
      a minimum power level needed by the first AMV to travel from the first location to the recovery location without having insufficient power to travel to the recovery location; and
   causing, prior to at least one of the last departure time or the minimum power level being reached, the first AMV to depart the first location and travel toward the recovery location.

2. The method of claim 1, wherein determining the recovery location includes receiving an identifier that includes location information and capabilities of the recovery location.

3. The method of claim 1, further comprising:
   sending to at least a second AMV, a relief instruction indicating that the second AMV is to arrive at the first location before at least one of the last departure time or before the first AMV reaches the minimum power level.

4. The method of claim 3, further comprising:
   determining that the second AMV has arrived at the first location; and
   wherein causing the first AMV to depart the first location is based at least in part on determining that the second AMV has arrived at the first location.

5. The method of claim 1, wherein determining at least one the last departure time, further includes determining at least one of an amount of power required by the first AMV to travel to the first location, a distance traveled by the first AMV to reach the first location, a rate at which power is being consumed by the first AMV, a distance to be traveled by the first AMV from the first location to the recovery location, or an amount of power anticipated to be consumed by the first AMV to travel from the first location to the recovery location.

6. The method of claim 1, wherein determining at least one of the minimum power level, further includes determining at least one of a rate at which power is consumed by the AMV when in transit or a distance between the first location and the recovery location.

7. A system, comprising:
   a first AMV operating at a first location;
   an AMV management system configured to at least:
      determine, by a processor, a remaining power of the first AMV;
      determine, by the processor, a recovery location;

determine, by the processor, at least one of:
a last departure time by which the first AMV must depart the first location to travel to the recovery location without having insufficient power to travel to the recovery location, or
a minimum power level needed by the first AMV to travel from the first location to the recovery location without having insufficient power to travel to the recovery location; and
send instructions to the first AMV that cause the first AMV to, prior to at least one of the last departure time or the minimum power level being reached, depart the first location and travel toward the recovery location.

8. The system of claim 7, wherein the AMV management system is further configured to at least:
determine a second AMV that is available to travel to the first location and remain at the first location when the first AMV departs the first location.

9. The system of claim 7, wherein the first AMV is at least one of an aerial vehicle, a ground based vehicle, or a water based vehicle.

10. The system of claim 7, wherein the AMV management system is further configured to at least:
send instructions to a second AMV to cause the second AMV to travel to the first location;
determine that the second AMV has arrived at the first location; and
wherein the instructions that cause the first AMV to depart from the first location are initiated based at least in part on a determination that the second AMV has arrived at the first location.

11. The system of claim 10, wherein the AMV management system is further configured to at least:
send instructions that cause the second AMV to provide a coverage at the first location.

12. The system of claim 7, wherein the AMV management system is further configured to at least:
determine an event area boundary within which a coverage is to be provided, wherein the first location is within the event area boundary;
determine event area information corresponding to an event area within the event area boundary;
determine a number of AMVs to deploy into the event area to provide the coverage;
determine a plurality of locations to which AMVs are to be positioned to provide the coverage, wherein the first location is one of the plurality of locations; and
send instructions to each of a plurality of AMVs to cause the AMVs to travel to a respective location of the plurality of locations and provide the coverage while at the respective locations.

13. The system of claim 12, wherein the coverage is at least one of lighting, audio input, audio output, video input, video output, a wireless network, or a wireless network access point.

14. The system of claim 12, wherein the event area information includes one or more of a coverage currently being provided by other AMVs in the event area, a coverage to be provided in the event area, an area within the event area boundary with poor coverage, weather within the event area, a location of other AMVs in the event area, a relief request from a second AMV in the event area, or a dangerous area within the event area.

15. A system comprising:
a first AMV operating at a first location;
a second AMV;
the first AMV including:
one or more processors; and
a memory storing program instructions that when executed by the one or more processors cause the one or more processors to at least:
determine at least one of:
a last departure time by which the first AMV must depart the first location to travel to a recovery location without having insufficient power to travel to the recovery location, or
a minimum power level needed by the first AMV to travel from the first location to the recovery location without having insufficient power to travel to the recovery location;
send an instruction to the second AMV, instructing the second AMV to travel to the first location and arrive at the first location prior to at least one of the last departure time or the minimum power level being reached;
determine that at least one of the second AMV has arrived at the first location, the minimum power level has been reached, or the last departure time has been reached; and
in response to the determination, cause the first AMV to travel to the recovery location.

16. The system of claim 15, wherein the program instructions further cause the one or more processors to at least:
activate a component coupled with the first AMV to cause the component to provide a coverage at the first location while the first AMV is at the first location.

17. The system of claim 15, wherein the program instructions further cause the one or more processors to at least:
determine a location of the recovery location based on one or more of recovery location information maintained in the memory of the first AMV, or an identifier received from the recovery location that identifies the location of the recovery location.

18. The system of claim 15, wherein:
the instructions are sent to a plurality of AMVs; and
the second AMV responds to the instructions.

19. The system of claim 15, wherein the program instructions further cause the one or more processors to at least:
receive from an AMV management system, an indication of the first location;
cause the first AMV to travel to the first location; and
determine, subsequent to arriving at the first location, a remaining power of the first AMV.

20. The system of claim 19, wherein the first location is one of a plurality of locations within an event area at which an AMV is to be positioned and provide a coverage.

* * * * *